United States Patent

Visscher et al.

[11] Patent Number: 6,017,568
[45] Date of Patent: *Jan. 25, 2000

[54] PROCESS FOR THE CONTINUOUS BOILING OF WORT

[75] Inventors: Hendrik J. Visscher, The Hague; Christiaan W. Versteegh, Delft, both of Netherlands

[73] Assignee: Heineken Technical Services B.V., Amsterdam, Netherlands

[ * ] Notice: This patent issued on a continued prosecution application filed under 37 CFR 1.53(d), and is subject to the twenty year patent term provisions of 35 U.S.C. 154(a)(2).

[21] Appl. No.: 08/716,263

[22] PCT Filed: Mar. 24, 1995

[86] PCT No.: PCT/NL95/00113

§ 371 Date: Dec. 16, 1996

§ 102(e) Date: Dec. 16, 1996

[87] PCT Pub. No.: WO95/26395

PCT Pub. Date: Oct. 5, 1995

[30] Foreign Application Priority Data

Mar. 25, 1994 [EP] European Pat. Off. .............. 94200803

[51] Int. Cl.$^7$ ..................................................... C12C 7/20

[52] U.S. Cl. ................................ 426/16; 426/11; 426/29; 426/520

[58] Field of Search .................................. 426/11, 16, 18, 426/28, 29, 592, 520, 476

[56] References Cited

U.S. PATENT DOCUMENTS

| | | | |
|---|---|---|---|
| 3,535,116 | 10/1970 | Harsanyi | 426/29 |
| 4,550,029 | 10/1985 | Kruger et al. | 426/487 |
| 4,552,060 | 11/1985 | Redl et al. | 94/278 |
| 4,801,462 | 1/1989 | Tonna | 426/16 |
| 5,453,285 | 9/1995 | Versteegh | 426/29 |
| 5,536,650 | 7/1996 | Versteegh | 435/93 |
| 5,648,246 | 7/1997 | Versteegh | 435/93 |

FOREIGN PATENT DOCUMENTS

| | | |
|---|---|---|
| 33 38 576 | 5/1985 | Germany . |
| C-43 04 975 | 3/1994 | Germany . |
| 953 445 | 3/1964 | United Kingdom . |
| 2 182 672 | 5/1987 | United Kingdom . |
| WO 92/12231 | 7/1992 | WIPO . |

OTHER PUBLICATIONS

Kirk–Othmer Encyclopedia of Chemical Technology, 3rd Ed., vol. 9, pp. 702–03.
Brauwelt, vol. 121, 1981 Nurnberg, pp. 49–51, K. Stippler "Kontinuierliche Wurzekochung mit Warmeruckgewinnung." see p. 49, col. 3; figure 2.

Primary Examiner—Curtis E. Sherrer
Attorney, Agent, or Firm—Pearne, Gordon, McCoy & Granger LLP

[57] ABSTRACT

This invention relates to a process for the continuous boiling of wort, comprising feeding the unboiled wort to a wort heater, wherein it is heated to a temperature between 75 and 125° C., introducing the heated wort in a plug flow reactor, preferably a rotating disc holding column, followed by treating the wort obtained from said reactor in countercurrent with steam in a stripping column.

17 Claims, 1 Drawing Sheet

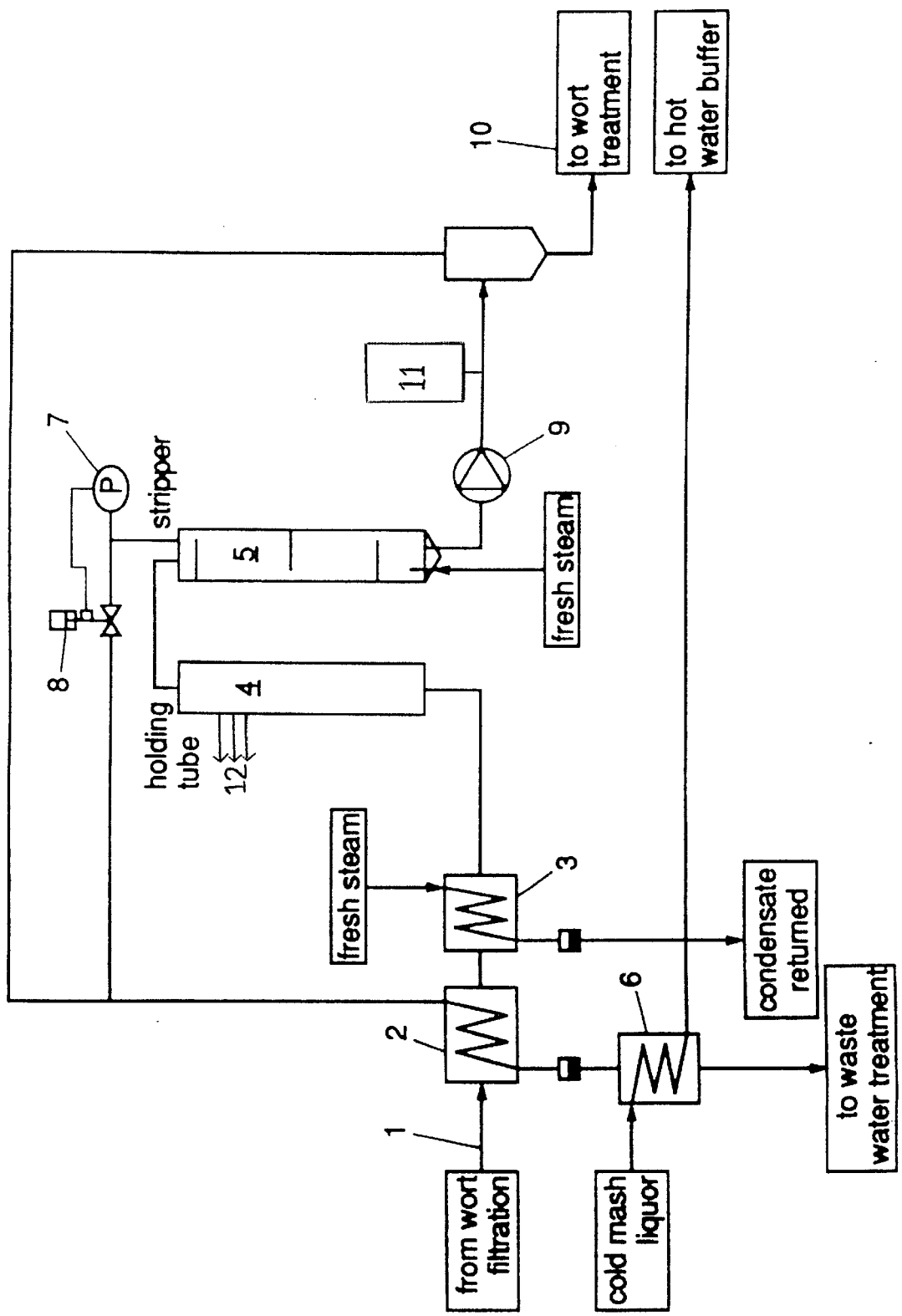

PROCESS FOR THE CONTINUOUS BOILING OF WORT

FIELD OF THE INVENTION

This invention relates to a process for the continuous boiling of wort, as well as to a process for brewing beer from said boiled wort.

DESCRIPTION OF RELATED ART

When preparing beverages from cereals, more in particular when brewing beer, wort is used. A conventional preparation of wort occurs by mixing the starting materials, e.g., comprising unmalted grain (maize) and water. The solid materials are first pulverised and then mixed with the water. The resulting slurry is kept for some time at a temperature of at least 40° C. in the presence of an enzyme source, e.g., malt. Gelatinization and liquefaction thereby occur. In a next step the enzymatic conversion of the mixture (mash) is continued after supplementary addition of malt and/or an external enzyme source. It is also possible to prepare wort on the basis of malt and water. Then the first step is omitted.

The product thus obtained consists mainly of water, insoluble components of the raw materials, as well as soluble components thereof, such as fermentable and unfermentable sugars and proteins. In the conventional method this mixture is filtered to remove the insoluble components, the spent grain. The filtrate or extract is the wort. For brewing beer, hop is then added to the wort, which is boiled. The trub formed is removed, and the wort is cooled to about 8° C. and fermented.

The aim of this wort boiling operation covers a diversity of goals:
- extraction of the bitter components of the hops,
- deactivation of enzymes and proteins,
- formation and agglomeration of trub for subsequent separation,
- sterilisation of the wort,
- the removal of volatile off-flavour components and
- the evaporation of excess sparging water.

Normally the effectiveness of the boiling process is determined by three parameters: duration, intensity (e.g. evaporation) and boiling temperature.

The necessary duration of the boiling to complete all desired effects is determined by the evaporation rate and the boiling temperature. The relatively slow isomerisation of hops is the rate determining step. At atmospheric pressure and about 100° C., a good isomerisation of hop takes a minimum of 45 minutes. At higher temperatures and pressures the isomerisation can be completed in times as short as two to three minutes.

Besides affecting the homogeneity of the boiling the vigour of the boiling is of special importance for the removal of volatiles. The more vigorous the boiling, the better the removal of sulphuric off-flavours. Especially sulphur compounds like dimethylsulphide (DMS) have a very low taste threshold in the final beer and can only be removed during boiling. The concentration of this compound will in fact increase again during later fermentation of the wort by yeast excretion.

The stripping effect of the boil is determined by the total evaporation during boiling and by the geometry of the wort kettle to obtain a good "rolling" boil. Typically evaporation rates of 6–8%/hr are used in the brewing industry. Because of the large amounts of water that have to be evaporated to achieve the desired off-flavour reduction, the boiling stage is one of the largest energy consuming processes in a brewery.

Although the boiling process can be accelerated significantly at elevated temperatures, either through external heat exchangers or pressure cooking or the use of multi-effect evaporators (known as HTW: High Temperature Wortboiling), overheating of the wort is known to have undesired effects on a number of quality aspects of the final beer among which are colour and head retention.

Although this HTW process is a continuous process, with the inherent advantages thereof, this process is not acceptable because of two reasons:

(a) The adverse effects on beer quality through the use of temperatures in the range of 120–130° C. which are significantly higher than what is used at the moment in the brewing industry, e.g. 100–108° C.

(b) The occurrence of severe fouling by protein precipitates in the holding tubes of the HTW. This requires a long and intensive cleaning which does not fit the requirement of a continuous operation.

It would be advantageous if wort could be boiled continuously, as such a step could then be incorporated in a continuous wort production process. This process could for example include the process steps disclosed in U.S. Pat. Nos. 5,536,650 and 5,453,285, the contents of which is incorporated herein by way of reference.

In order to be able to operate continuously it is a requirement to have only short or negligible cleaning breaks and boiling under atmospheric conditions as used presently in the most widely adapted boiling operation in the industry.

The aim of the present invention is to provide a continuous boiling process which may be part of a continuous brewhouse, wherein the disadvantages of the prior art methods have been minimised and which process is capable of producing a boiled wort from which a beer can be brewed having a beer quality that is comparable to the traditional batch-wise process.

SUMMARY OF THE INVENTION

The present invention is concerned with a continuous boiling process of wort, said process comprising feeding the unboiled wort to a wort heater, wherein it is heated to a temperature between 75 and 125° C., introducing the heated wort in a plug-flow reactor, preferably a rotating disc holding reactor, followed by treating the wort obtained from said reactor in countercurrent with steam in a stripping column.

BRIEF DESCRIPTION OF THE DRAWING

The FIGURE shows a process according to the invention.

DESCRIPTION OF THE PREFERRED EMBODIMENTS

The wort heater or heat exchanger is preferably a plate or shell-and-tube heat exchanger heated with steam. In this heater the incoming wort is heated from the filtration temperature (typically 75° C.) to the boiling temperature. Because of the continuous flow the required heating area is smaller than conventional exchangers.

Also applicable for this purpose would be a evaporator (for example of the falling-film type), which could be used for heating the wort as well as producing the steam for the later stripping section.

The wort is than transferred into a holding column, operating at a temperature of from 75 to 125° C. and a pressure of 1 to 2 bar, to obtain the required residence time for the several reactions to take place at temperatures close to the boiling temperature. The rotating disc column (or rotating disc contactor) is equipped with a rotating axis fitted with a large number of discs. The discs serve two purposes:

(1) to apply a gentle stirring to aid the coagulation and agglomeration of trub particles and keep them in suspension, thus preventing the excessive fouling of the column internals, and (2) to obtain a controllable residence time distribution so that all the wort is subjected to the same duration at higher temperatures.

As plug flow reactor, various types of reactor may be used, in which connection it is of special importance that no unacceptable back-mixing and or pre-mixing of the components occur. Examples thereof are tubular reactors and cascades of more or less ideally agitated tank reactors. A preferred type of reactor is the so-called rotating disc contactor, which is a known type of vertical column reactor as described in, e.g., Kirk-Othmer, Encyclopedia of Chemical Technology, Third edition, Vol. 9, page 702.

Such a reactor generally consist of a vertical column provided with a central agitator shaft having attached thereto 10 or more discs or plates. These discs or plates cover at least 80% of the cross section of the column. In general, this surface does not exceed 95%. By rotating the shaft and discs in the column a proper dispersion of the solid matter in the liquid occurs.

The use of a contactor instead of an arrangement of holding tubes has the advantage that due to the stirring action, when wort passes the holding tubes at low speed (necessary to obtain an acceptable residence time) the agglomerated denatured proteins and enzymes bonded with hop resins or polyphenols from malt or hop will not settle.

In the past this precipitation caused residues in the tubes at high temperatures at long times, which form a impenetrable deposit requiring a thorough cleaning action using alternating hot and cold water cleaning cycles to "crack" the deposits from the tube surface. The rotating discs contactor prevents the formation of deposits by the agitation, the absence of baffles ensures a minimum of dead-spots inside the column.

The volume of the plug flow reactor and more in particular the rotating disc contactor is chosen to reach a holding time of 45–75 minutes, during this time all the desired reactions will have proceeded sufficiently.

In the third stage of the process the wort is fed to a distillation type stripping column, operating at a temperature of from 75 to 125° C. and a pressure of 1 to 2 bar. The column is fitted with trays on which the wort is stripped, preferably countercurrently with fresh saturated steam.

Because of the large number of trays (at least 5 trays) and subsequent equilibrium stages the volatile components are removed in a very short time at a high efficiency. The residence time in the column is typically only 10 s to ten minutes, preferably 0,5 to 2 minutes. Because of the high efficiency the use of stripping steam is smaller than the net evaporation during traditional wort boiling. The gain in energy consumption is therefore significant. The continuous operation further enables the reuse of the stripping steam to heat the incoming wort. Optionally the wort is heated and partially evaporated in a evaporation unit, the generated vapours serving as the stripping medium in the stripping column.

As stripping section various types of stripping and/or distillation equipped can be used, such as a tray or packed column, for example using the so-called Sulzer™ packing, or a baffled column.

A stripping column will preferably have 5 or more trays or a packed height of at least 2 meters.

The tray-type column with downcomers assures a good mixing of steam and wort and has a broad operating range. As the volume is very small this type of column can easily be cleaned by successive filling and draining of the column in either normal flow or reverse flow. Care has to be taken during mash filtration prior to the boiling of the wort as particles resulting from inadequate mash separation may block the upper trays.

Saturated steam is fed through a bottom inlet below the bottom tray or packing. Because of the highly efficient mass transfer the steam flow can be set as low as 4–6 wt. % of the mass flow of wort.

A good insulated column is necessary to maintain equilibrium between wort and steam temperature to prevent steam condensing in the wort resulting in undesired dilution of the wort and inefficient steam usage.

The use of a holding column in combination with a stripping column offers a number of unexpected benefits in a process-technological view. As one of the most important off-flavour components, dimethylsulphide (DMS), is formed from a non-volatile precursor, the holding stage assures that a maximum amount of the precursor is transformed into DMS entering the stripping section. This means that the resulting level of DMS will be very low, as DMS itself is removed with high efficiency in the stripping section.

The stripped wort leaving the evaporator can now be treated further in either a continuous way or a traditional way (trub separation through centrifuges or whirlpool, wort cooling and aeration and fermentation). A further continuous treatment of the wort leaving the boiling section means that the holding time at high temperatures can be shortened even further to a couple minutes by separating the trub in continuous fashion with a centrifuge. Traditionally the use of a whirlpool means that the wort is subjected to long holding times in the range of 20–100 minutes at 95–100° C., that are not beneficial to the wort quality.

The cooled wort can be fermented, optionally after residence time in a buffer vessel. The invention therefore also relates to a process for brewing beer using the wort prepared as described above.

The process of the present invention accordingly offers the following advantages:

continuous operation atmospheric boiling conditions optimum trub formation by low shear conditions highly efficient off-flavour stripping replacing high evaporation rates highly energy efficient enabling high heat recovery favourable low oxidation conditions as there is no contact with air.

a well defined residence time in the entire arrangement, resulting in no effects of inadequate mixing or localised overheating low volume equipment enables effective cleaning and less usage of cleaning agents.

small area requirements of the equipment compared to traditional boiling coppers.

reuse and subsequent condensation of the stripping steam containing the off-flavours prevents the emission to the atmosphere.

reduced heat load on the wort due to the shorter processing times.

The invention will now be illustrated with reference to the accompanying drawing showing an example of the process scheme according to an embodiment of the invention.

In the figure a process according to the invention is shown, comprising a three element boiling section consisting of a wort inlet 1, receiving the wort from the mash filtration or mash filtration buffer vessel. This wort, having a temperature in the range of 75° C., is heated using heat exchangers 2 and 3, being a shell-and-tube, a spiral or a plate heat exchanger. The heating medium in heat exchanger 2 is steam exiting from the stripper and heat exchanger 4 is fed with fresh steam. In the heat exchangers the wort is heated to a temperature of 100° C. or slightly higher (1 to 3° C.) to counter the heat loss in the holding column 4. The wort is fed to the column 4. Holding column 4 is of the vertical rotating disc type equipped with a rotating agitating shaft driven by a motor with gear.

The holding column 4 can be fed from either top or bottom inlet, the bottom inlet being chosen in this embodiment as in this case the stripping column 5 is fed from top enabling a down flow by gravity. The residence time in the holding column can be set by adding outlets 12 at selected heights in the column.

The stripping section 5 is fed from the bottom with saturated steam controlled by a pressure reduction valve and a mass flow measurement coupled with a flow-regulating valve. The flow rate of steam is set as a fixed percentage of the wort flow entering the stripping section to obtain an optimum operation regime, preventing either raining or flooding flow regimes on the trays. The steam leaving the stripper, which contains high concentrations of stripped components is either discharged through a chimney or can be condensed partly (by heating incoming wort with exchanger 2) or be totally condensed by using exchanger 2 in conjunction with a condenser 6, after which the condensate can be treated in the waste water processing plant. With the aid of pressure gauge 7 and regulating valve 8 it is possible—though not necessary—to operate the arrangement at elevated pressures and temperatures offering the opportunity to run the arrangement at higher throughputs. This is of course limited only by the maximum flow possible within the operating regimes of the stripping column. Wort leaving the downcomer from the bottom tray can be pumped 9 to the trub separation section 10 and further processing of the wort. When using the arrangement at elevated pressures the wort exiting from the stripping section will have to be flashed to ambient conditions in a separate buffer vessel 11. A level controller in the bottom of the stripping column separates the higher pressure in the column from the atmospheric pressure in the receiving and/or flashing vessel.

The invention will be further illustrated by an Example, but is not limited thereto.

EXAMPLE and COMPARATIVE EXAMPLE

A filtered wort was produced in a conventional manner, the mash having been produced by an infusion scheme, which mash is subsequently filtered by means of a lautertun. The wort coming from the lautertun had a temperature of 74° C. The filtrate collected from the lautertun, having a gravity of 12.5°P, was led to a shell and tube heat exchanger, in which the wort was heated, using fresh steam on the shell side, to temperature of 103° C. The wort exiting from the heat exchanger was introduced into the bottom of a rotating disc contactor with a volume of 600 l at a flow rate of 1200 l/h. This contactor had a vertical rotating axis provided with 40 discs.

In the holding reactor (rotating disc contactor) S-methylmethionine (SMM) was satisfactorily converted to dimethylsulphide (DMS).

The wort was subsequently fed into the top section of a tray column equipped with 12 trays and downcomers. The hold up volume of the column was approximately 20 l. Fresh, saturated steam was fed into the bottom section of the column, representing a stripping ratio of 5%.

The boiled wort was subsequently fed to a separator for removal of trub and cooled. This wort was processed further to beer and bottled.

At various stages of the process the level of DMS was determined.

| | |
|---|---|
| After filtration: | 74 µg/l |
| After contactor | 195 µg/l |
| After stripper | <10 µg/l* |
| After separator and cooling | 20 µg/l |
| Final beer | 40 µg/l** |

*detection limit is 10 µg/l
**well below the taste threshold

As a comparison a part of the filtrate coming from the lautertun was boiled in a conventional batch-wise wort boiling kettle and processed further to a beer. An analytical and organoleptical comparison showed no significant differences, except for the slightly darker colour of the beer obtained by the conventional process. This can be attributed to the longer residence times at elevated temperature, which is known to cause darkening of the wort.

What is claimed is:

1. A process for the continuous boiling of wort, comprising feeding unboiled wort to a wort heater, wherein said wort is heated to a temperature between 75 and 125° C., introducing the heated wort in a plug flow reactor, and subsequently treating the wort obtained from said reactor in countercurrent with steam in a stripping column, said plug flow reactor comprising a plug flow reactor column provided with a central agitator shaft having attached thereto at least ten discs.

2. A process as claimed in claim 1, wherein the plug flow reactor has multiple outlets to control the residence time of the wort at a fixed inlet flow.

3. A process as claimed in claim 1, including operating the plug flow reactor at an absolute pressure of from 1 to 2 bar, and a temperature of from 75 to 125° C.

4. A process as claimed in claim 1, including indirectly heating the said wort heater with steam exiting from the said stripping column.

5. A process as claimed in claim 1, wherein hop pellets and/or hop extracts are added before or after the said wort heater.

6. A process as claimed in claim 1, including operating the stripping column at an absolute pressure of from 1 to 2 bar, and a temperature of from 75 to 125° C.

7. A process according to claim 1, including using the stripping stream as heating medium in the wort heater and/or for heating process flows other than material in the wort heater.

8. A process as claimed in claim 1, including flashing the wort from the stripping column into a buffer vessel.

9. A process as claimed in claim 1, including cooling and fermenting the boiled wort.

10. A process for brewing beer, comprising fermenting wort obtained using the process as claimed in claim 1.

11. A process as claimed in claim 5, wherein said hop pellets and/or hop extracts are pre-isomerised.

12. A process as claimed in claim 1, wherein the boiled wort, after clarification, is cooled and fermented.

13. A process as claimed in claim 1, including maintaining said heated wort in said plug flow reactor for a residence time of 45–75 minutes.

14. A process as claimed in claim 1, said plug flow reactor column being a vertical column.

15. A process as claimed in claim 14, said discs covering at least 80% of the cross section of said vertical column.

16. The process as claimed in claim 14, said discs covering not more than 95% of the cross section of said vertical column.

17. The process as claimed in claim 15, said discs covering not more than 95% of the cross section of said vertical column.

* * * * *

UNITED STATES PATENT AND TRADEMARK OFFICE
CERTIFICATE OF CORRECTION

PATENT NO. : 6,017,568
DATED : January 25, 2000
INVENTOR(S) : Hendrik J. Visscher, et al.

It is certified that error appears in the above-indentified patent and that said Letters Patent is hereby corrected as shown below:

On the Title Page, in Item [30] Foreign Application Priority Data, line 1 "94200803" should be --94200803.8--.

On the Title Page, in Item [56] before the first listed reference, add "3,321,384  1/1966  Rigby et al. ..........426/600".

Signed and Sealed this

Second Day of January, 2001

Attest:

Q. TODD DICKINSON

Attesting Officer

Commissioner of Patents and Trademarks